Aug. 10, 1948.    C. W. SCHWARZ ET AL    2,446,558
BENCH TOOL FOR STRIPPING ARMOR FROM CABLE
Filed March 12, 1945    3 Sheets-Sheet 1

Inventors
C. W. Schwarz,
T. Floyd.
By Ralph L. Chappel
Attorney

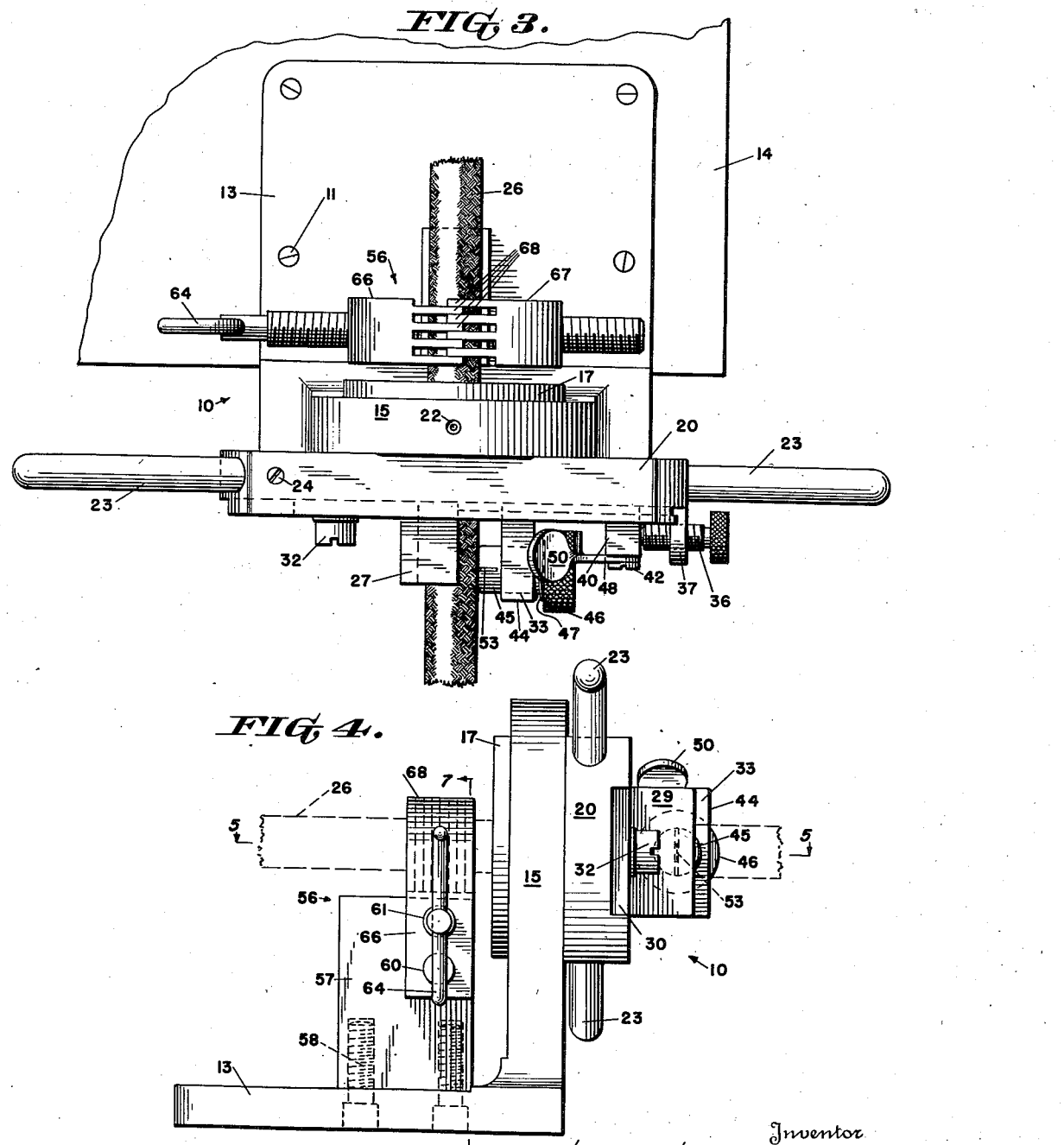

Aug. 10, 1948.   C. W. SCHWARZ ET AL   2,446,558
BENCH TOOL FOR STRIPPING ARMOR FROM CABLE
Filed March 12, 1945                                3 Sheets-Sheet 3
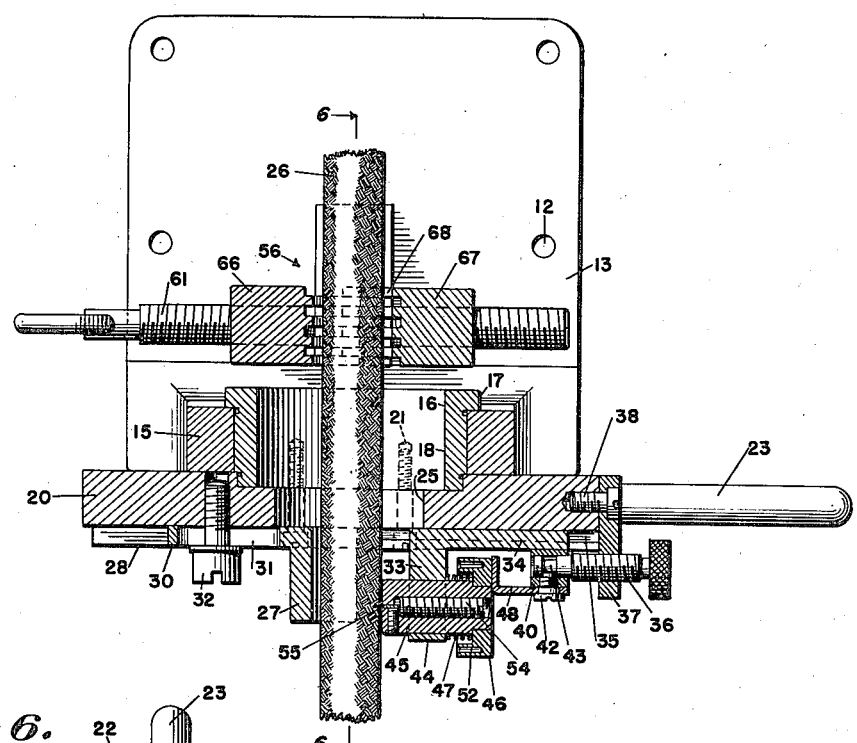
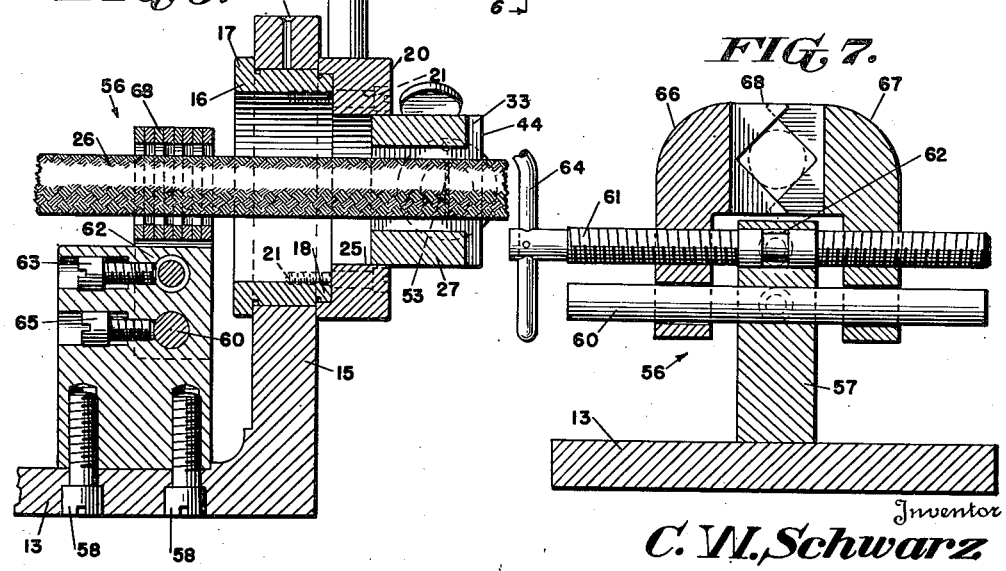
Inventor
C. W. Schwarz
T. Floyd.
By Ralph L. Chappell
Attorney Patented Aug. 10, 1948

2,446,558

UNITED STATES PATENT OFFICE 2,446,558

BENCH TOOL FOR STRIPPING ARMOR FROM CABLE

Carl W. Schwarz, Washington, D. C., and Theodore Floyd, Hyattsville, Md.

Application March 12, 1945, Serial No. 582,372

9 Claims. (Cl. 164—36)

(Granted under the act of March 3, 1883, as amended April 30, 1928; 370 O. G. 757)

This invention relates to a bench tool for stripping armor from cable and has for an object to provide an improved bench tool facilitating the removal of the sheathing of armor or insulation from electrical cable by providing a means for easily and quickly making a circumferential cut in the sheathing of the armor or the insulation and then making a longitudinal cut of any desired length in the cable sheathing, thus enabling the armor or insulation sheathing to be readily removed.

A further object of this invention is to provide a cable armor stripping tool which will hold the cable securely while a circumferential cut is being made thereon and may be then adjusted to provide a longitudinal slit in the armor, which slit is made during the act of removing the cable from the tool.

A still further object of this invention is to provide a cable armor stripping tool which may be readily adjusted to fit any desired diameter cable and will remain in the set adjustment for as long as desired, while working on the same diameter of cable, yet may be readily adjusted at any time to fit a different diameter of cable.

Still another object of this invention is to provide a cable armor stripping tool having a readily removable and replaceable blade which may be adjusted to make a cut in the cable of any desired depth and wherein the same blade is used for making both the circumferential and longitudinal cut in the armor or insulation sheathing.

With the foregoing and other objects in view, the invention consists in the construction, combination and arrangement of parts hereinafter set forth, claimed and illustrated in the drawings in which:

Fig. 3 is a top plan view of Figs. 1 and 2 with the cable in position for making the circumferential cut.

Fig. 4 is a side view looking at the right side of Fig. 3.

Fig. 5 is a sectional view approximately on line 5—5 of Fig. 4.

Fig. 6 is a sectional view approximately on line 6—6 of Fig. 5, and

Fig. 7 is a sectional view approximately on line 7—7 of Fig. 4.

Figure 1:
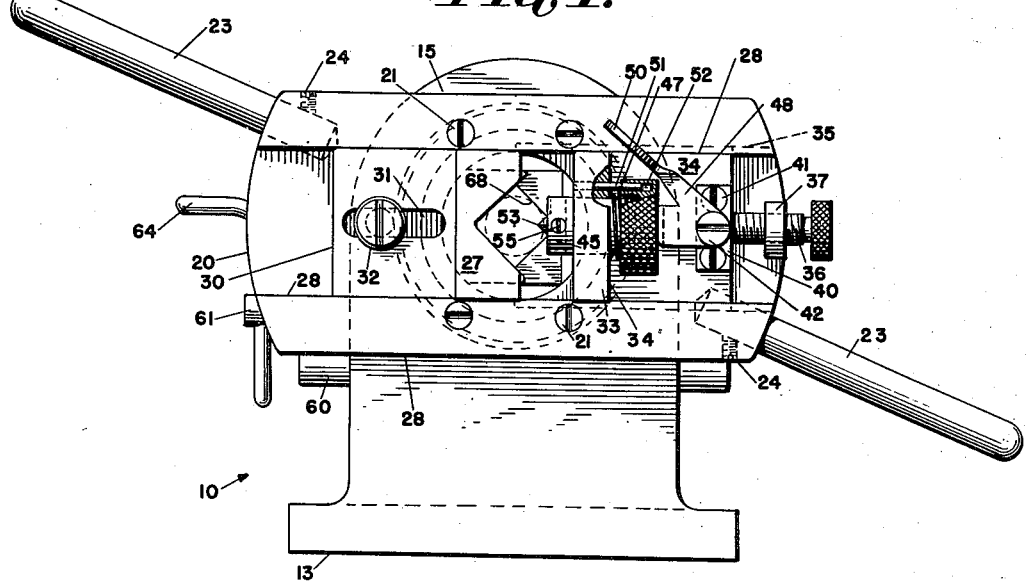
Fig. 1 is an elevational view of the cable armor stripping bench tool of this invention viewed from the front or cable insertion side.
Figure 2:
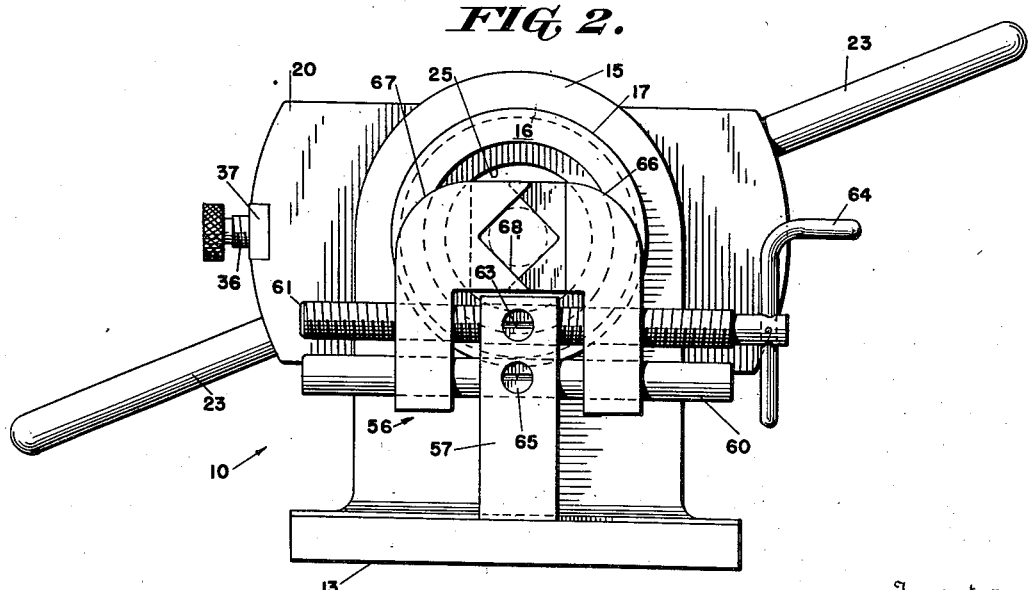
Fig. 2 is a rear view of Fig. 1.

There is shown at 10 the bench tool of this invention adapted to be secured by studs 11 through stud holes 12 in its base 13 to a suitable supporting surface such as the corner of a table 14. Extending from base 13 is an upright 15, here shown as integral with the base 13, although obviously it may be made as a separate base and be secured thereto either by welding or stud screws. This upright 15 is provided with a large horizontal aperture through which is journaled a bushing 16 having a flange 17 on one side of the upright 15 and a reduced neck 18 on which is secured a cutter-carrying head 20 by means of studs 21. The upright 15 is provided with a vertical oil chanel 22, enabling the bushing 16 to be lubricated for easy rotation, the head 20 having handles 23 secured diametrically opposite each other by means of set screws 24, thus enabling the head 20, which is fixed on the bushing 16, to be rotated freely whenever desired.

This head 20 is provided with a horizontal aperture 25 concentric with the opening through the bushing 16. The size of the aperture 25 in the head 20 limits the maximum diameter of cable 26 that can be operated upon in this tool. It is desired that the cable 26 be supported concentrically of the head aperture 25; accordingly, a V-block 27 is provided, resting on the head 20 between two raised flanges 28. The V-block 27 has an extending tail 30 having a longitudinal slot 31 through which extends a securing screw 32 for holding the V-block 27 in adjusted position relative to the center of the aperture 25.

Mounted on the same head 20 on the side opposite from the V-block 27 is a knife assembly consisting of an angle block 33 having one arm 34 provided with oppositely extending slides riding in countersunk trackways 35 in the flanges 28 of the head 20, thus permitting the angle block 33 to be adjusted along the head 20 by means of an adjusting screw 36 extending through a finger 37 secured by a screw 38 to the end of the head 20. The adjusting screw 36 cooperates with the angle block 33 by means of a small block 40 secured by screws 41 to the angle block arm 34. A pivot screw 42 extends through the block 40 into a neck 43 on the adjusting screw 36, as a result of which rotation of the screw 36 causes the angle block 33 to slide within the countersunk trackways 35.

The other angle block arm 44 is provided with a round aperture through which extends a cutter block 45 having a knob cap 46 at its outer end. A coil spring 47 tends to force this cutter block 45 outwardly away from the cable aperture 25. This outward movement is limited by a latch 48 pivoted on a neck on the pivot screw 42, this latch 48 being provided with a thumbpiece 50. Obviously, adjusting screw 36 in turn serves to adjust the position of the cutter block 45. When the thumbpiece 50 has been raised, the coil spring 47 expands and the knob cap 46 is raised and disengages itself from a positioning pin 51 extending through the angle block 44 into any one of four selected positioning apertures 52 on the bottom of the knob cap 46.

The cutter block 45 has a cutter blade 53 extending through its bottom any desired distance as determined by a positioning screw 54 extending axially through the cylindrical cutter block 44, while a set screw 55 serves to lock the cutter blade in the adjusted position.

Behind the upright 15 there is provided a vise assembly 56 consisting of a vise supporting block 57 secured as by studs 58 to the base 13. Extending through this vise-supporting block 57 through suitable apertures is a vise jaw guide pin 60 and a vise jaw screw 61 being oppositely threaded from a reduced central neck 62 into which extends a stud screw 63 for holding the screw 61 in position, yet permitting it to be rotated by means of handle 64. A set screw 65 serves to hold the guide pin 60 in position. Mounted on the guide pin 60 and controlled by the screw 61 are a pair of vise jaws 66 and 67 having intersecting V-teeth 68, the V-teeth being so positioned that the horizontal line joining the apexes will intersect a line joining the vertical meeting points at the axial center of the head aperture 25.

In operation, the cable 26 to be stripped is inserted from the front of the tool through the head aperture 25 and through the bushing for a distance as far as the armor is to be removed therefrom. The vise screw 61 is then operated by handle 64 to cause the vise jaws 66 and 67 to approach each other and have the V-fingers 68 clamped tight on the cable. The V-block 27 is then adjusted by loosening the stud screw 32 to support the cable in a horizontal position. Then, with the latch 48 in contact against the knob cap 52 on the cutter block 45, the screw 36 is tightened until the blade 53 has penetrated the cable armor to the required depth. The cutter head 20 is then rotated a full revolution by means of its handles 23, thus completing a circular cut around the circumference of the cable 26. After this is done, the hold-down latch 48 is released, permitting the spring 47 to raise the cutter block so that the knob cap 46 is no longer in contact with the positioning pin 51. The knob cap 46 is then rotated 90 degrees, turning the blade 53 from a position transverse to the cable to a position parallel to the cable. The cutter block is then pressed down again and held in position by the latch 48 and the handle 64 is operated to loosen the vise from the cable end, thus freeing the cable and permitting it to be withdrawn from the tool by pulling it forwardly from the front side of the tool. As this is done, the knife blade 53 makes a longitudinal cut along the armor of the cable from the circumferential cut to the end of the cable, thus permitting the neck slit armor to be easily, manually removed therefrom.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

1. A bench tool for stripping sheathing from a cable, comprising a base, an upright supported on said base, a centrally apertured cutter-carrying head journaled on said upright, a cable-supporting means adjustably supported on said cutter head on one side of its central aperture, a cutter block support slidably and adjustably mounted on said cutter head on the side opposite from said cable-supporting means, a cutter block rotatably extending through said cutter block support, yieldable supporting means urging said cutter block away from said cutter head aperture, means for latching said cutter head against said yieldable means, angle positioning means locking said cutter block against rotation when in latched position, a cutter blade adjustably secured in said cutter block, and a cable-embracing vise mounted on said base behind said cutter head aperture in axial alignment therewith, whereby the cable may be held fixed while said head is rotated with said cutter blade extending circumferentially of said cable to cut said sheathing circumferentially, and then said cutter blade may be released, rotated to a position extending longitudinally of the cable, relatched into sheathing cutting position, and then said vise may be released from said cable to permit it to be withdrawn from said tool, cutting the sheathing longitudinally as it is withdrawn.

2. A bench tool for stripping sheathing from a cable, comprising a base, an upright supported on said base, a centrally apertured cutter-carrying head, an apertured bushing journaled through said upright, said cutter head being mounted on said bushing for rotation therewith, a cable-supporting block adjustably supported on said cutter head on one side of its central aperture, a cutter block support slidably mounted on said cutter head on the side opposite from said block, a cutter-carrying block rotatably, with respect to its own longer axis, extending through said cutter block support, yieldable supporting means urging said cutter block axially away from said cutter head aperture, means for latching said cutter head axially against said yieldable means, angle positioning means locking said cutter block against rotation when in latched position, and a cable-embracing vise mounted on said base behind said cutter head aperture in axial alignment therewith.

3. A bench tool for stripping sheathing from a cable, comprising a base, an upright supported on said base, a centrally apertured cutter-carrying head, an apertured bushing journaled through said upright, said cutter head being mounted on said bushing for rotation therewith, a cable-supporting V-block adjustably supported on said cutter head on one side of its central aperture, a cutter block support slidably mounted on said cutter head on the side opposite from said V-block, a cutter block rotatably extending through said cutter block support, yieldable supporting means urging said cutter block away from said cutter head aperture, means for latching said cutter head against said yieldable means, angle positioning means locking said cutter block against rotation when in latched position, a cutter blade adjustably secured in said cutter block, means for adjustably fixing the position of said cutter blade support on said head, and a cable-embracing vise mounted on said base behind said cutter head aperture in axial alignment therewith, whereby the cable may be held fixed in said vise while said head is rotated with said cutter blade extending circumferentially of said cable to cut said sheathing circumferentially, and then said cutter blade may be released, rotated to a position extending longitudinally of the cable, relatched into sheathing cutting position, and then said vise may be released from said cable to permit it to be withdrawn from said tool, cutting the sheathing longitudinally as it is withdrawn.

4. A bench tool for stripping sheathing from a cable, comprising a base, an upright supported on said base, a centrally apertured cutter-carrying head, handle means on said head, an apertured bushing journaled through said upright, said cutter head being mounted on said bushing for rotation therewith, a cable-supporting V-block adjustably supported on said cutter head on one side of its central aperture, a cutter block support slidably mounted on said cutter head on the side opposite from said V-block, a cutter block rotatably extending through said cutter block support, yieldable supporting means urging said cutter block away from said cutter head aperture, means for latching said cutter head against said yieldable means, angle positioning means locking said cutter block against rotation when in latched position, a cutter blade adjustably secured in said cutter block, and a cable-embracing vise mounted on said base behind said cutter head aperture in axial alignment therewith, said cable-embracing vise comprising a pair of jaws, cable-embracing V-fingers on said jaws, a jaw guide pin extending through said vise supporting block and said vise jaws, a double reverse-threaded screw centrally journaled on said vise supporting block and threaded through said jaws and handle means on said vise screw for operating said screw to move said jaws towards and from each other, whereby the cable may be held fixed in said vise while said head is rotated with said cutter blade extending circumferentially of said cable to cut the sheathing circumferentially, and then said cutter blade may be released, rotated to a position extending longitudinally of the cable, relatched into sheathing cutting position, and then said vise may be released from said cable to permit it to be withdrawn from said tool, cutting the sheathing longitudinally as it is withdrawn.

5. A bench tool for stripping sheathing from a cable comprising a support, a centrally apertured cutter-carrying means journaled on said support, a cutter mounted radially and rotatably adjustable on said cutter-carrying means, and a lockable manually operated disabling cam means for initially advancing said cutter radially a fixed depth into said cable extending through said centrally apertured cutter-carrying means.

6. A bench tool for stripping sheathing from a cable comprising a support, a centrally apertured cutter-carrying means journaled on said support, a cutter mounted radially and rotatably adjustable on said cutter-carrying means, and a lockable manually operated disabling cam means for initially advancing said cutter radially a fixed depth into said cable extending through said centrally apertured cutter-carrying means and means on said support for holding the cable extending through said centrally apertured cutter-carrying means.

7. A bench tool for stripping sheathing from a cable comprising a support, a centrally apertured cutter-carrying means journaled on said support, a cutter mounted radially and rotatably adjustable on said cutter-carrying means, and a lockable manually operated disabling cam means for initially advancing said cutter radially a fixed depth into said cable extending through said centrally apertured cutter-carrying means and a cable-supporting means adjustably mounted on the front of said centrally apertured cutter-carrying means.

8. A bench tool for stripping sheathing from a cable comprising a support, a centrally apertured cutter-carrying means journaled on said support, a cutter mounted radially and rotatably adjustable on said cutter-carrying means, and a lockable manually operated disabling cam means for initially advancing said cutter radially a fixed depth into said cable extending through said centrally apertured cutter-carrying means and V-vise means axially aligned behind said centrally apertured cutter-carrying means for holding the cable extending through said centrally apertured cutter-carrying means.

9. A bench tool for stripping sheathing from a cable comprising a support, a centrally apertured cutter-carrying means journaled on said support, a cutter mounted radially and rotatably adjustable on said cutter-carrying means, and a lockable manually operated disabling cam means for initially advancing said cutter radially a fixed depth into said cable extending through said centrally apertured cutter-carrying means and V-vise means axially aligned behind said centrally apertured cutter-carrying means for holding the cable extending through said centrally apertured cutter-carrying means, and a cable-supporting means adjustably mounted on the front of said centrally apertured cutter-carrying means.

CARL W. SCHWARZ.
THEODORE FLOYD.

REFERENCES CITED

The following references are of record in the file of this patent:

UNITED STATES PATENTS

| Number | Name | Date |
|---|---|---|
| 1,433,320 | Wersel | Oct. 24, 1922 |
| 1,656,755 | Palmer | Jan. 17, 1928 |
| 1,841,251 | Miller | Jan. 12, 1932 |
| 1,888,381 | Galbraith | Nov. 22, 1932 |
| 1,902,616 | Brungardt | Mar. 21, 1933 |
| 1,941,364 | Neminghoff | Dec. 26, 1933 |
| 1,985,541 | Hoefer | Dec. 25, 1934 |
| 2,046,341 | McParlin | July 7, 1936 |
| 2,086,104 | Wensley | July 6, 1937 |
| 2,089,774 | Wachstein | Aug. 10, 1937 |
| 2,186,061 | Berg | Jan. 9, 1940 |
| 2,288,670 | Babiary | July 7, 1942 |